United States Patent
Kim

(10) Patent No.: US 7,610,039 B2
(45) Date of Patent: Oct. 27, 2009

(54) CODING METHOD OF MOBILE USER EQUIPMENT

(75) Inventor: Min-Gyo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/073,062

(22) Filed: Mar. 4, 2005

(65) Prior Publication Data

US 2005/0197102 A1 Sep. 8, 2005

(30) Foreign Application Priority Data

Mar. 5, 2004 (KR) .................. 10-2004-0015154

(51) Int. Cl.
*H04M 1/66* (2006.01)
(52) U.S. Cl. .............. 455/410; 455/411; 455/435.1; 455/558; 455/419; 713/171; 380/247
(58) Field of Classification Search ........ 455/410–411, 455/558, 419–420, 432.1, 433, 435.1; 380/270, 380/247; 713/159, 176
See application file for complete search history.

(56) References Cited

U.S. PATENT DOCUMENTS

| | | | | |
|---|---|---|---|---|
| 5,237,612 | A * | 8/1993 | Raith | 380/247 |
| 5,513,245 | A * | 4/1996 | Mizikovsky et al. | 455/411 |
| 5,557,654 | A * | 9/1996 | Maenpaa | 455/411 |
| 5,625,671 | A * | 4/1997 | Salin | 455/411 |
| 5,630,159 | A * | 5/1997 | Zancho | 709/221 |
| 5,675,628 | A * | 10/1997 | Hokkanen | 455/433 |
| 5,689,549 | A * | 11/1997 | Bertocci et al. | 455/463 |
| 5,689,563 | A * | 11/1997 | Brown et al. | 380/247 |
| 5,933,773 | A * | 8/1999 | Barvesten | 455/411 |
| 5,940,589 | A * | 8/1999 | Donovan et al. | 726/4 |
| 5,956,633 | A * | 9/1999 | Janhila | 455/410 |
| 5,987,325 | A * | 11/1999 | Tayloe | 455/435.2 |
| 6,075,860 | A * | 6/2000 | Ketcham | 713/159 |
| 6,091,945 | A * | 7/2000 | Oka | 455/411 |
| 6,091,946 | A * | 7/2000 | Ahvenainen | 455/411 |
| 6,138,005 | A * | 10/2000 | Park | 455/411 |
| 6,141,544 | A * | 10/2000 | Corriveau et al. | 455/411 |
| 6,148,192 | A * | 11/2000 | Ahvenainen | 455/410 |
| 6,164,547 | A * | 12/2000 | Vapaakoski et al. | 235/474 |

(Continued)

FOREIGN PATENT DOCUMENTS

CN 1111377 A 11/1995

(Continued)

*Primary Examiner*—Sharad Rampuria
(74) *Attorney, Agent, or Firm*—Lee, Hong, Degerman, Kang & Waimey

(57) ABSTRACT

An International Mobile Equipment Identification (IMEI) is coded and then stored in a user equipment (UE), wherein an authorized user is allowed to change the existing IMEI. When an IMEI is inputted, the UE generates a security code and stores the IMEI and the generated security code in a memory. Thereafter, if a second security code and IMEI is inputted, the UE determines whether the inputted security code is identical with the pre-stored security code. If the two security codes are identical with each other, the UE generates a third security code and stores the IMEI and the generated third security code. Thus, unauthorized IMEI storage is prevented. Accordingly, the IMEI coding method of the mobile UE can prevent unauthorized use of the UE while allowing the IMEI to be re-coded without hardware alteration.

11 Claims, 2 Drawing Sheets

U.S. PATENT DOCUMENTS

| | | | |
|---|---|---|---|
| 6,223,290 B1 | 4/2001 | Larsen et al. | 713/201 |
| 6,266,525 B1 * | 7/2001 | Peterson | 455/410 |
| 6,285,869 B1 * | 9/2001 | Shannon et al. | 455/411 |
| 6,427,073 B1 * | 7/2002 | Kortesalmi et al. | 455/414.1 |
| 6,459,893 B2 * | 10/2002 | Pentikainen | 455/414.1 |
| 6,480,725 B2 * | 11/2002 | Cassidy et al. | 455/558 |
| 6,507,734 B1 * | 1/2003 | Berger et al. | 455/410 |
| 6,738,622 B1 * | 5/2004 | Heutschi et al. | 455/435.1 |
| 6,754,483 B2 * | 6/2004 | Beamish et al. | 455/410 |
| 6,778,828 B1 * | 8/2004 | Chander et al. | 455/435.1 |
| 6,836,670 B2 * | 12/2004 | Castrogiovanni et al. | 455/558 |
| 6,980,660 B1 * | 12/2005 | Hind et al. | 380/282 |
| 7,054,613 B2 * | 5/2006 | Smeets | 455/410 |
| 7,072,646 B1 * | 7/2006 | Brune et al. | 455/417 |
| 7,106,845 B1 * | 9/2006 | Zhuk et al. | 379/207.11 |
| 7,127,236 B2 * | 10/2006 | Khan et al. | 455/414.1 |
| 7,349,697 B2 * | 3/2008 | Onaka et al. | 455/435.1 |
| 7,426,382 B2 * | 9/2008 | Aerrabotu et al. | 455/411 |
| 7,437,181 B2 * | 10/2008 | Simmons | 455/558 |
| 7,502,607 B2 * | 3/2009 | Laitinen | 455/411 |
| 7,505,769 B2 * | 3/2009 | Jiang | 455/432.3 |
| 2002/0009199 A1 * | 1/2002 | Ala-Laurila et al. | 380/247 |
| 2003/0061488 A1 * | 3/2003 | Huebler et al. | 713/176 |
| 2003/0163685 A1 | 8/2003 | Paatero | |
| 2004/0132449 A1 * | 7/2004 | Kowarsch | 455/432.1 |
| 2004/0166839 A1 * | 8/2004 | Okkonen et al. | 455/419 |
| 2005/0020259 A1 * | 1/2005 | Herrero | 455/433 |
| 2005/0075137 A1 * | 4/2005 | Reemtsma | 455/559 |
| 2005/0170813 A1 * | 8/2005 | Choi | 455/411 |
| 2005/0227669 A1 * | 10/2005 | Haparnas | 455/410 |
| 2005/0272406 A1 * | 12/2005 | Mizikovsky et al. | 455/411 |
| 2006/0025177 A1 * | 2/2006 | Tu | 455/558 |

FOREIGN PATENT DOCUMENTS

| | | |
|---|---|---|
| JP | 64-48151 | 2/1989 |
| JP | 07-288866 | 10/1995 |
| KR | 1020000027575 A | 2/2000 |
| KR | 1020020045286 A | 6/2002 |

* cited by examiner

CODING METHOD OF MOBILE USER EQUIPMENT

CROSS-REFERENCE TO RELATED APPLICATIONS

Pursuant to 35 U.S.C. § 119(a), this application claims the benefit of earlier filing date and right of priority to Korean Application No. 10-2004-0015154, filed on Mar. 5, 2004, the contents of which is hereby incorporated by reference herein in its entirety.

BACKGROUND OF THE INVENTION

1. Field of the Invention

The present invention relates to mobile user equipment, and particularly, to an International Mobile Equipment Identification (IMEI) coding method for a Global System for Mobile Communications (GSM) user equipment (UE).

2. Description of the Related Art

In general, a GSM user equipment (UE), also known as a mobile, subscriber unit, remote station or mobile terminal, supports an international roaming service using a Subscriber Identity Module (SIM) card. The SIM card is a type of smart card that provides a user with the ability to perform mobile communication operations. A SIM card may be removed from one UE and installed into another UE.

In order to provide an international roaming service, the UE has an International Mobile Subscriber Identity (IMSI) and an International Mobile Equipment Identity (IMEI) for securing personal mobility. The IMSI is stored on the SIM card while the IMEI, which is an equipment identity of the UE, is stored in a flash memory internal to the UE.

FIG. 1 is a flow chart illustrating a method of storing an IMEI of the UE in accordance with the related art. The IMEI can be easily written by a simple attention command (AT command) through an IMEI utility, such as an IMEI writing program running on a personal computer (PC).

Referring to FIG. 1, the UE manufacturer inputs an AT command containing an IMEI to the UE by using an IMEI writing program of a PC (S110). When the AT command is inputted to the UE, a Mobile Station Modem (MSM) of the UE checks whether the AT command which has been inputted from the IMEI writing program is an IMEI write command (S120). If the inputted command is the IMEI write command, the IMEI contained in the AT command is stored in a flash memory of the UE (S130).

As described above, the UE supporting an international roaming service stores the IMEI for securing the personal mobility in the flash memory. Thus, mobile communications providers can trace a UE that has been reported as lost or stolen, using the IMEI recorded in its flash memory.

However, a drawback to the above coding function is that the IMEI can be easily overwritten. Thus, a third person may easily use the lost or stolen UE after rewriting the IMEI. Also, it would be difficult for a mobile communications provider to trace the lost or stolen UE after the IMEI is rewritten.

Accordingly, to prevent a third person from illegally using the lost or stolen UE by writing a new IMEI, UE manufacturers are using an IMEI coding method by hardware. However, although effectively preventing unauthorized use of a lost or stolen UE by a third person, the IMEI coding method by hardware makes it difficult for a new IMEI to be designated upon an authorized user's request. Currently, in order to designate a new IMEI by hardware, the entire UE, or a circuit board within the UE, must be replaced by a UE manufacturer or service center.

SUMMARY OF THE INVENTION

The present invention is directed to an International Mobile Equipment Identification (IMEI) coding method preferably for a Global System for Mobile Communications (GSM) user equipment (UE).

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an equipment identity coding method for a mobile user equipment is provided. The method comprises receiving an input command comprising an equipment identity, generating a security code when the input command is received, and coding and storing the equipment identity by using the generated security code.

In one embodiment, the equipment identity comprises an International Mobile Equipment Identifier (IMEI) for a Global System for Mobile Communications (GSM) user equipment (UE), for example. The security code is generated when the input command is an equipment identity write command, wherein the generated security code is stored in the user equipment. In accordance with one aspect of the invention, the stored security code is outputted to an equipment identity writing program from which the input command was received.

In one embodiment of the invention, an equipment identity coding method of a mobile user equipment comprises receiving an input command comprising a first equipment identity, generating a first security code when the input command is received, coding and storing the first equipment identity by using the first security code, receiving a second input command comprising a second equipment identity, comparing a pre-stored first security code with a second security code when the second input command is received, wherein the second security code is contained in the second input command, generating a third security code when the first and second security codes are identical with each other, and coding and storing the second equipment identity by using the third security code.

In certain embodiments, each of the first and second equipment identities comprises an International Mobile Equipment Identifier (IMEI). Furthermore, the third security code is generated when the input command comprising the second equipment identity is an equipment identity write command. Moreover, the first and third security codes are stored in the user equipment.

In accordance with a further aspect of the invention, the stored first and third security codes are outputted to an equipment identity writing program from which the inputted command was received. The outputted first security code is inputted and contained in a second equipment identity inputted after the first equipment identity has been stored in the user equipment. The outputted third security code is inputted and contained in an equipment identity inputted after the second equipment identity has been stored in the user equipment.

Preferably, the method further comprises outputting the stored first and third security codes. Also, the second equipment identity is inputted after the first equipment identity has been stored in the user equipment. Moreover, if the first and second security codes are not identical with each other, no operation related to the second equipment identity is performed.

In another embodiment of the invention, an equipment identity coding method of a mobile user equipment, comprises receiving, at a user equipment, an input command of a second equipment identity containing a second security code, checking whether a first security code is stored in the user equipment when the input command is an equipment identity write command, determining whether the first and second security codes are identical with each other when the first security code is stored in the user equipment, and generating a third security code if the first and second security codes are identical with each other, and coding and storing the second equipment identity in the user equipment by using the generated third security code.

The second equipment identity contains an International Mobile Equipment Identifier (IMEI). The third security code is generated when the input command of the equipment identity is an equipment identity write command. The third security code is stored in the user equipment.

In accordance with one aspect of the invention, the method further comprises outputting the third security code. Furthermore, the third security code is outputted to an equipment identity writing program from which the input command was received, wherein the outputted third security code is inputted and contained in a next equipment identity input command inputted after the second equipment identity. If the first and second security codes are not identical with each other, no operation related to the second equipment identity is performed.

In another embodiment, the method of the present invention is embodied in a software program to allow a processor to read and execute an equipment identity coding method of a mobile user equipment, the method comprising receiving, at a user equipment, an input command of a second equipment identity containing a second security code, checking whether a first security code is stored in the user equipment when the input command is an equipment identity write command, determining whether the first and second security codes are identical with each other when the first security code is stored in the user equipment, and generating a third security code if the first and second security codes are identical with each other, and coding and storing the second equipment identity in the user equipment by using the generated third security code.

In another embodiment, the invention is embodied in a processor-readable storage media storing a software program to allow a processor to read and execute a coding method of a mobile user equipment, the method comprising receiving, at a user equipment, an input command of a second equipment identity containing a second security code, checking whether a first security code is stored in the user equipment when the input command is an equipment identity write command, determining whether the first and second security codes are identical with each other when the first security code is stored in the user equipment, and generating a third security code if the first and second security codes are identical with each other, and coding and storing the second equipment identity in the user equipment by using the generated third security code.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

DETAILED DESCRIPTION OF THE PREFERRED EMBODIMENTS

The present invention relates to a coding method for a mobile user equipment used in a wireless communication system. Preferably, an International Mobile Equipment Identification (IMEI) is coded and then stored in a user equipment (UE), wherein an authorized user is allowed to change the existing IMEI to a new one.

Figure 1:
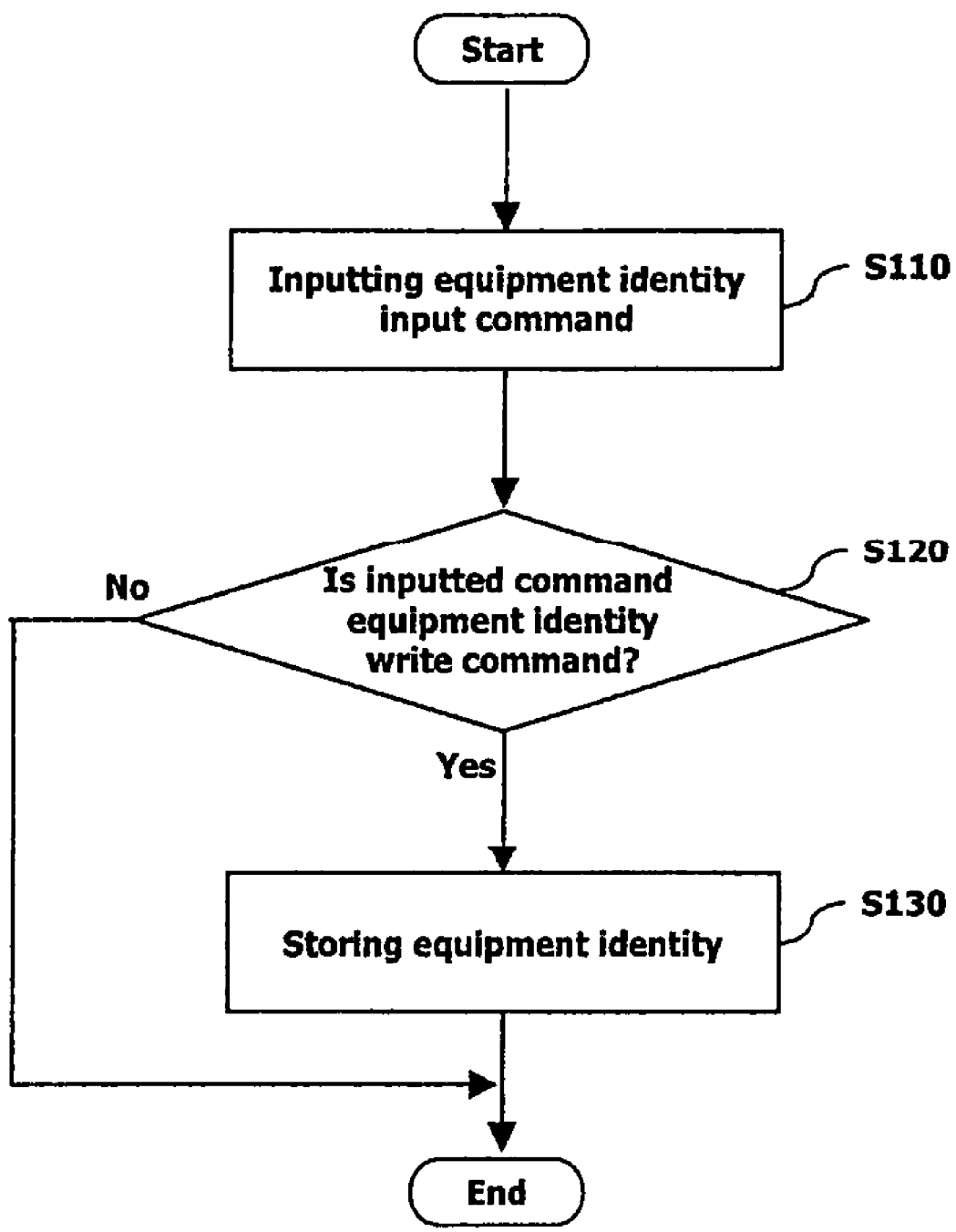
FIG. 1 is a flow chart illustrating a method of storing an IMEI of a GSM user equipment in accordance with the related art.
Figure 2:
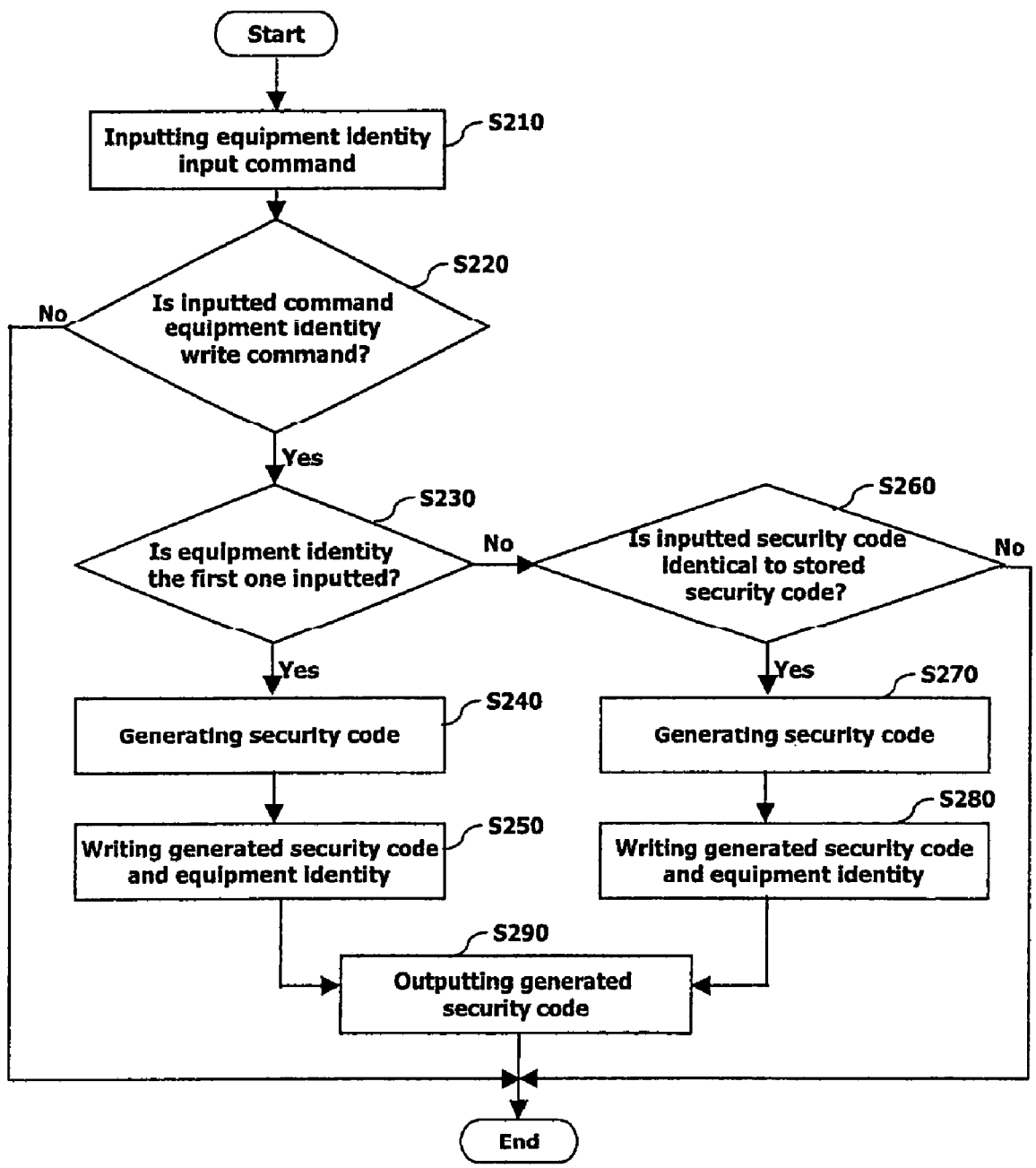
FIG. 2 is a flow chart illustrating an IMEI coding method of a mobile user equipment in accordance with one embodiment of the present invention.

Referring to FIG. 2, a method for storing the IMEI of the mobile UE using a coding algorithm will now be described, in accordance with one embodiment.

When a manufacturer inputs an IMEI into the UE for the first time, the UE does not check for a security code. Thus, the manufacturer may input an IMEI that does not contain a security code. However, if the IMEI to be inputted is not the first one inputted, the IMEI cannot be stored without a security code. Accordingly, the manufacturer inputs an attention command (AT command) including a new IMEI and the security code, wherein the security code is the code generated when a previous IMEI was inputted.

An initially inputted IMEI is called a first IMEI. An IMEI inputted after the first IMEI is called a second (or subsequent) IMEI. If the UE manufacturer inputs to the UE an AT command containing the first IMEI using an IMEI writing program of a personal computer (PC) (S210), a Mobile Station Modem (MSM) of the UE checks whether the AT command inputted from the IMEI writing program is an IMEI write command (S220). If the inputted command is the IMEI write command, the MSM determines whether the IMEI write command is being inputted for the first time (S230).

In the determining segment of S230, if the inputted IMEI is the first IMEI, that is, if a first AT command containing the first IMEI is being inputted for the first time, a first security code is generated using a coding algorithm stored in the UE (S230, S240), and the generated first security code and the first IMEI are stored in a flash memory of the UE (S250). The UE then outputs the first security code stored in the flash memory to the IMEI writing program of the PC (S290).

In order for a second AT command containing the second IMEI to be accepted, the second AT command should contain not only the second IMEI but also the first security code which had been outputted to the IMEI writing program at the time of writing the first IMEI. Here, the outputted first security code may also be called a second security code.

When the second IMEI is inputted to the UE to which the first IMEI has already been inputted, specifically, if the first security code has already been stored in the UE, the IMEI writing program inputs an AT command containing the second IMEI to be inputted and the second security code value as was outputted when the first IMEI was inputted (S210). Then, the UE checks whether the inputted AT command is an IMEI write command (S220), and compares the first security code stored in the UE with the second security code inputted together with the second IMEI (S260), if the IMEI is not the same as the first IMEI (S230).

In the comparison process of segment S260, if the second security code inputted together with the second IMEI is different from the stored first security code, that is, if the second IMEI is being illegally inputted, for example, the UE will not perform any command related to the second IMEI input and is terminated. However, if the second security code inputted together with the second IMEI is identical with the first security code, that is, if an authorized UE manufacturer inputs the second IMEI, for example, the UE generates a third security code by using a coding algorithm stored therein (S270), and stores the generated third security code and the second IMEI in the flash memory (S280). Thereafter, the UE outputs the generated third security code to the IMEI writing program of the PC (S290).

Advantageously, the security code obtained through such processes cannot be disclosed to a third person. In addition, in order to change or read an IMEI which has already been written, the IMEI writing program must have the security code. Thus, in accordance with one embodiment, no operation can be performed without inputting the matching security code.

If problems occur during a process where the IMEI is inputted for the first time during manufacturing, special equipment may be needed to rewrite a new IMEI. The IMEI can be inputted after calibration is carried out through the equipment.

Accordingly, unlike the related art in which the hardware itself must be replaced to change an IMEI (even upon an "after" service (A/S) request by an authorized user), the present invention allows an authorized user to securely change an IMEI by software. Thus, costs incurred by having to replace the entire UE are saved because entire replacement is no longer necessary.

In the IMEI coding method of the mobile UE in accordance with the present invention, the IMEI is stored in the UE by applying a software coding algorithm, wherein an authorized user can change the IMEI. Furthermore, any unauthorized attempt to change the IMEI by a third person, such as when the UE is lost or stolen change, is prevented. Accordingly, user convenience is improved and the additional cost incurred in replacing the UE is saved.

The present invention can be embodied as software, hardware, or a combination of both. For example, the coding method of mobile user equipment according to the present invention can be embodied as codes or commands in a software program that can be stored in a storage media (such as an internal memory of the UE, a flash memory, etc.) and that can be executed by a processor (such as a microprocessor within the UE).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An equipment identity coding method of a mobile terminal comprising:
   receiving an equipment identity input from a terminal;
   determining if a first security code is stored in the mobile terminal when the equipment identity input is received from the terminal;
   generating a security code when the equipment identity input command is received if the first security code is not stored in the mobile terminal;
   transmitting the security code to the terminal;
   coding the equipment identity and the security code in the mobile terminal;
   storing the coded equipment identity and the coded security code in the mobile terminal;
   receiving a second input command comprising a second equipment identity and a second security code from a second terminal;
   comparing the security code with the second security code when the second input command is received;
   generating a third security code if the security code and second security code match;
   transmitting the third security code to the second terminal;
   coding the second equipment identity and the third security code; and
   storing the second equipment identity and the third security code in the mobile terminal, wherein the equipment identity is changed to the second equipment identity, wherein the equipment identity and second equipment identity comprises an International Mobile Equipment Identifier (IMEI) for a Global System for Mobile Communications (GSM) user equipment (UE).

2. An equipment identity coding method of a mobile terminal comprising:
   receiving a first input command comprising a first equipment identity from a first terminal;
   generating a first security code when the first input command is received;
   transmitting the first security code to the terminal;
   coding the first equipment identity and the first security code;
   storing the coded first equipment identity and the first security code in the mobile terminal;
   receiving a second input command comprising a second equipment identity and a second security code from a second terminal;
   comparing the first security code with the second security code when the second input command is received;
   generating a third security code if the first and second security codes match;
   transmitting the third security code to the second terminal;
   coding the second equipment identity and the third security code; and
   storing the second equipment identity and the third security code in the mobile terminal, wherein the first equipment identity is changed to the second equipment identity, wherein each of the first and second equipment identities comprises an International Mobile Equipment Identifier (IMEI).

3. The method of claim 2, wherein the third security code is generated when the input command comprising the second equipment identity is an equipment identity write command.

4. The method of claim 2, wherein the third security code is input with a third equipment identity after the second equipment identity has been stored in the mobile terminal.

5. The method of claim 2, wherein no operation related to the second equipment identity is performed if the first and second security codes are not identical with each other.

6. An equipment identity coding method of a mobile terminal comprising:

receiving an input command comprising of a second equipment identity and a second security code from a terminal;

determining whether a first security code is stored in the user equipment when the input command is an equipment identity write command;

determining whether the first and second security codes match when the first security code is stored in the user equipment;

generating a third security code if the first and second security codes are identical with each other;

transmitting the third security code to the terminal;

coding the second equipment identity and the third security code storing the coded second equipment identity and the third security code in the mobile terminal, wherein the second equipment identity contains an International Mobile Equipment Identifier (IMEI).

7. The method of claim 6, wherein the third security code is generated when the input command of the equipment identity is an equipment identity write command.

8. The method of claim 6, wherein the third security code and a third equipment identity are input after the coded second equipment identity is stored in the mobile terminal.

9. The method of claim 6, wherein no operation related to the second equipment identity is performed if the first and second security codes are not identical with each other.

10. A method for reading and executing an equipment identity code of a mobile terminal, the method comprising:

receiving, at a user equipment, an input command comprising of a second equipment identity and a second security code from a terminal;

determining whether a first security code is stored in the user equipment when the input command is an equipment identity write command;

determining whether the first and second security codes match when the first security code is stored in the user equipment; and generating a third security code if the first and second security codes match;

transmitting the third security code to the terminal; and coding the second equipment identity using the generated third security code, wherein a first equipment identity is changed to the second equipment identity, and wherein the second equipment identity contains an International Mobile Equipment Identifier (IMEI).

11. A processor-readable storage media storing a software program to allow a processor to read and execute a coding method of a mobile terminal, the method comprising:

receiving an input command comprising of a second equipment identity and a second security code from a terminal;

determining whether a first security code is stored in the user equipment when the input command is an equipment identity write command;

determining whether the first and second security codes match when the first security code is stored in the user equipment; and generating a third security code if the first and second security codes match;

transmitting the third security code to the terminal;

coding the second equipment identity and the third security code; and storing the coded second equipment identity and the third security code in the mobile terminal, wherein a first equipment identity is changed to the second equipment identity, and wherein the second equipment identity contains an International Mobile Equipment Identifier (IMEI).

* * * * *